United States Patent [19]
Cibulka

[11] 3,853,147
[45] Dec. 10, 1974

[54] RESPIRATOR FLOW CURVE MODIFIER

[75] Inventor: Anthony B. Cibulka, Poynette, Wis.

[73] Assignee: Airco, Inc., New York, N.Y.

[22] Filed: Jan. 8, 1973

[21] Appl. No.: 321,906

[52] U.S. Cl. .................................. 138/30, 138/46
[51] Int. Cl. ............................................ F16l 55/04
[58] Field of Search ............. 138/30, 46, 26; 73/392

[56] References Cited
UNITED STATES PATENTS
| | | | |
|---|---|---|---|
| 2,828,769 | 4/1958 | Cooper | 138/30 |
| 2,838,073 | 6/1958 | Di Mattia et al. | 138/30 |

FOREIGN PATENTS OR APPLICATIONS
| | | | |
|---|---|---|---|
| 848,978 | 9/1960 | Great Britain | 138/30 |

*Primary Examiner*—James J. Gill
*Assistant Examiner*—Anthony V. Ciarlante
*Attorney, Agent, or Firm*—Roger M. Rathbun; Edmund W. Bopp; H. Hume Mathews

[57] ABSTRACT

A device for modifying the normally square-pulse characteristics of the flow curve of square-wave respirators to provide a gradual development to maximum flow. The device includes a chamber having a movable wall mounted for displacement therein, a gas flow passage being defined between the wall and a bounding surface at one side of the chamber. An inlet and outlet to the flow space enables connection of the device in line with the respirator. The chamber is preferably closed on the side opposite the movable wall by a retaining diaphragm. A plate is mounted across the chamber between movable wall and retaining diaphragm, and the spaces on alternate sides of the plate are interconnected through an orifice, which can be present through the plate itself. A damping fluid is provided in at least the space between plate and movable wall. Gas flowing into the device inlet proceeds through the flow space during the inspiratory portion of the respirator cycle and displaces the movable wall to enlarge the flow passage. As the movement of the wall must in turn displace damping fluid through the orifice, the impedance thereby provided modifies the gas flow curve so that the latter approaches its maximum value in asymptotic fashion. Means are also provided for restoring the movable wall to its original position upon completion of a gas flow pulse.

19 Claims, 7 Drawing Figures

PATENTED DEC 10 1974          3,853,147

RESPIRATOR FLOW CURVE MODIFIER

BACKGROUND OF INVENTION

This invention relates generally to medical respirators, and more particularly relates to apparatus for modifying the flow pattern in a respirator of the type normally providing a square wave type of flow output.

The sudden increase from zero to maximum flow conditions provided by respirators with square wave flow-versus-time delivery, may produce undesirable effects for patients being thereby treated. This is particularly true in those instances where the patient is subjected to very high flow rates as, for example may occur during the course of intensive care treatment, where gas flow rates as high as 200 liters/minute are occasionally used. In the presence particularly of such high flow rate conditions, excessive pressure shock can be introduced into the patient's respirator system, in consequence of the abrupt rise in the gas feed rate from zero to full flow conditions. In order to eliminate this sudden shock it would appear desirable to provide for a more gradual rise in flow rate as a function of time, as this would permit the patient's bronchial tubes to more gradually open during the inspiratory cycle thereby permitting the rate at which access is enabled to the bronchial tubes to match the developing rate of flow in the respirator. In the past, however, simple and highly dependable means have not been available which readily enabled modification of the square-wave output in order to meet the criteria cited.

In accordance with the foregoing, it may be regarded as an object of present invention, to provide a simple and highly dependable device which is insertable into the gas flow line of a square-wave respirator, and which serves to modify the flow characteristics so that the ensuing flow reaches its maximum value in asymptotic fashion, thereby eliminating the shock of the patient's respiratory system.

It is a further object of the present invention, to provide a device for modifying the square-wave flow characteristics of a respirator system, to yield pulses gradually building to maximum flow, which device is readily adaptable to a variety of respirator systems and flow requirements.

SUMMARY OF INVENTION

Now, in accordance with the present invention, the foregoing objects and others as will become apparent in the course of the instant specification, are achieved in a device including a chamber having an inlet and outlet for connecting said device into a respirator system. The chamber is preferably closed on one side by a retaining diaphragm. This retaining diaphragm is separated from a displaceable wall, which may constitute a further diaphragm, by a dividing plate. The spaces on alternate sides of the plate are connected through an orifice — which may be defined as a passage through the plate. A damping fluid reservoir is provided in the space between the plate and the movable wall. Gas flows into the device inlet at the side of the movable wall non-adjacent the damping fluid, and proceeds through a gas flow passage defined between the movable wall and an adjacent bounding surface at the chamber. Pressure at the device inlet arising from the inspiratory portion of the respiratory cycle, displaces the movable wall to enlarge the gas flow passage. As the movement of the wall must, in turn, displace the damping fluid through the orifice, the flow curve approaches its maximum value in asymptotic fashion. The orifice may be of variable size in order to meet differing flow requirements, or other conditions of the equipment in which the device is incorporated. Means such as a check valve or the like and/or restoring force elements at the movable wall and/or retaining diaphragm may also be provided for facilitating return of the damping fluid to the reservoir. The dividing plate is preferably mounted in a horizontal plane, with the movable wall being vertically displaceable, whereby gravitational flowthrough in part effects return of the fluid through the orifice upon completion of a gas flow pulse.

BRIEF DESCRIPTION OF DRAWINGS

The invention is diagrammatically illustrated by way of example in the drawings appended hereto in which.

DESCRIPTION OF PREFERRED EMBODIMENT

Figure 1:
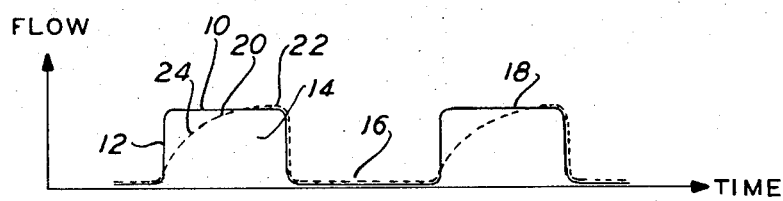
FIG. 1 is a graphical depiction of gas flow as a function of time, and sets forth the normal curve provided by a square-wave respirator in comparison with the modified flow curve yielded in accordance with the invention.

In FIG. 1 herein a graphical showing is set forth depicting at curve 10 the flow characteristics of a conventional square-wave respirator as a function of time. As is seen therein, this curve 10 is characterized by the fact that a virtually square flow pulse 14 is provided, having an essentially vertical leading edge 12. This is to say that the normal flow of devices of the stated type are characterized by periods as at 16 at which no flow is present, followed by an abrupt rise 12 from the zero flow condition to maximum flow condition as at 18. While this type of flow pattern is useful in a variety of treatment situations, it is found particularly where a patient is the subject of intensive care treatment, that the abrupt noflow to maximum-flow output thus provided, can be a shock to the patient's respiratory system. In particular the bronchial tubes of the patient do not have adequate time to accommodate to the sudden rise in flow and pressure, in consequence of which a shock occurs during the early portion of the flow pulse 14 — with detrimental effects upon the patient.

In accordance with the construction now to be set forth by the present invention, the so-called "normal"

curve 10 is modified to provide the curve 20 as shown by the dotted line. This curve is seen to be characterized by a peak value 22 which is identical with the maximum flow level 18 provided in curve 10. However, the said curve 20 differs from curve 10 in that there is no sharp leading edge thereof; rather the curve 20 includes a portion 24 which rises from an initial no-flow level to approach asymptotically the maximum flow condition.

Figure 2:
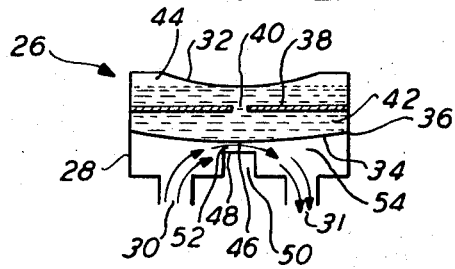
FIG. 2 is a schematic depiction in cross-section of a device in accordance with the present invention, the said device being shown therein at the beginning of the inspiratory portion of the flow cycle.

Referring now to FIG. 2, a cross-sectional schematic view is set forth through a device 26 in accordance with the present invention. The device depicted may be assumed to possess cylindrical geometry, but other geometries, including rectangular are effective. Device 26 is seen to include a chamber 28, having an inlet 30 and an outlet 31. The said inlet and outlet enables connection of device 26 at any convenient in-line point of the respirator in which the device is incorporated; that is to say, at any point where the flow to the patient may be controlled. The end of chamber 28 opposite that at which the inlet and outlet are provided, is closed by a retaining diaphragm 32, which may be a flexible material, such as rubber, neoprene or a flexible polymeric plastic or so-forth. Mounted across the chamber 28 closer to the gas flow side thereof is a movable wall 34. In the embodiment shown in FIG. 2 this movable wall comprises a second flexible diaphragm, which is similar to diaphragm 32 and may thus comprise a material such as a polymeric plastic, rubber, neoprene or so-forth. In the embodiment depicted the perimeter 36 of the movable wall is secured to the walls of the chamber 28, so that the edge of the wall is fixed while all intervening surface portions may be displaced.

Between the movable wall 34 and the spaced retaining diaphragm 32, is a relatively rigid dividing plate 38, which may comprise sheet metal, plastic, or the like. Plate 38 is secured to the edges of chamber 28, and is seen to be provided with a central orifice 40. A damping fluid 42, which typically comprises a light liquid such as a light oil, water or so-forth, occupies the space between wall 34 and plate 38 as well as a portion of the space between plate 38 and diaphragm 32; part of the latter space is also occupied by a gas, such as air at 44.

The principles pursuant to which operation of the present device occurs may now be set forth. In particular, it will be seen that the center portion 46 of movable wall 34 cooperates with an adjacent bounding surface 48, provided, for example, by an inwardly directed projection 50 at the wall chamber 38, so as to define therebetween a gas flow passage 52. Projection 50, where device 26 possesses cylindrical geometry, extends across chamber 28, and its surface 48 is preferably bowed lengthwise (downwardly in the sense of the drawing) so as to conform to the arced shape of adjacent wall 34 when the diaphragm constituting such wall is expanded. Assuming initially that the device 26 has the fluid 42 displaced as shown in the figure, it will be evident that movable wall 34 is extended as shown, whereby the gas passage 52 provided between movable wall and surface 48 is relatively narrow.

As the pressure initially builds up within inlet 30 in consequence of the respirator beginning the inspiratory portion of its cycle, pressure begins to develop within gas flow space 54 behind movable 34, in consequence of which the latter begins to be displaced (in the sense of the diagram upwardly). At this point, however, the damping fluid, namely, the liquid present at 42, impedes the movement of wall 34, but nevertheless begins to flow through orifice 40 into the upper part of chamber 28. The process is, of course, one in which a time delay occurs in view of the limited speed with which fluid may pass through orifice 40. In consequence the flow passage 52 widens, but only in a gradual fashion; the ensuing flow thus follows the curve 20, as previously referred to.

Figure 3:
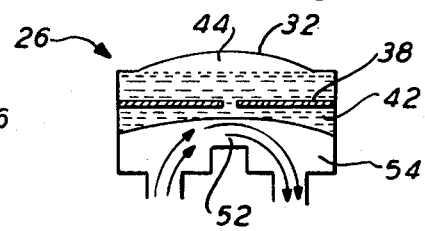
FIG. 3 is a schematic depiction of the FIG. 1 device, showing the position of the several components thereof at a later point in time during the said inspiratory portion of the breathing cycle.

Referring to FIG. 3, it is seen that as the flow gradually continues, the movable wall 34 continues to be displaced upwardly until the gas passage 52 reaches a maximum opening, which thus corresponds to the point 22 on curve 20. At this point the fluid 42 has been displaced to its maximum above plate 38, and it is further seen that retaining diaphragm 32 is expanded upwardly by the air 44 trapped above the said liquid.

Upon completion of the developed flow pulse 14, the overpressure provided within space 54 is terminated. Assuming that the device 26 is in fact oriented as shown in FIGS. 2 and 3, the damping fluid 42 may return to the lower portion of chamber 28 under the influence of gravity through orifice 40, such return being further expedited by the restoring forces present at diaphragms 32 and 34 due to their inherent elasticity. Alternatively or additionally, spring biasing means as is known in the art may be provided to facilitate return movement of diaphragms 32 and 34. Yet more rapid action, furthermore may be achieved by the simple expedient of incorporating a return check valve into plate 38. Such a check valve is seen at 56 in FIG. 4, setting forth a simple modification of a portion of the said path 38. The valve 56 shown may comprise, as illustrated, a simple flapper-type arrangement.

The orifice interconnecting alternate sides of plate 38, need not necessarily be provided through the plate itself. In the fragmentary schematic cross-section of FIG. 4A a form of the invention is thus shown which is in most respects similar to the devices of FIGS. 2 through 4; however, in this instance the dividing plate 78 is not provided with an orifice. Rather an external connection is provided via tubing 80 between alternate sides of plate 78. The orifice in this instance takes the form of a valve 82 located in tubing 80. This valve may be of the well-known needle-type, and by virtue of the ready control of such valve it is clear that means are now present for varying the orifice opening in order to provide desired variation in the damping rate.

Figure 4:
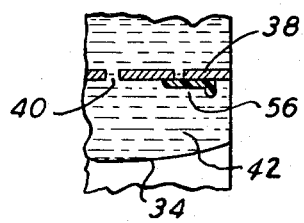
FIG. 4 is a fragmentary cross-section of a modified form of the FIGS. 2 and 3 apparatus.
Figure 4A:
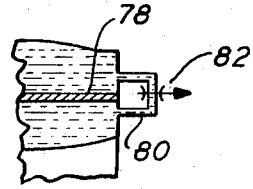
FIG. 4A is a fragmentary cross-section, similar to FIG. 2, but illustrating an embodiment of the invention wherein an orifice is enabled at an external connecting path.
Figure 5:
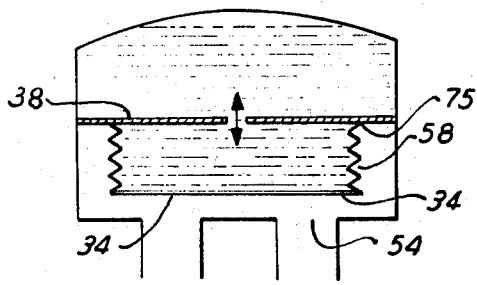
FIG. 5 is a schematic cross-section of a yet further modified form of the invention.

In FIG. 5 herein, a further modification of the FIG. 2 apparatus is set forth. In the device there shown, the movable wall constitutes a light plate 34 of plastic, metal or the like, which again is displaced upwardly by pressure provided in space 54. In this case the movable wall is secured to plate 38 by a bellows 58 of metal, plastic, or the like, which bellows is sealed to the plate at 75. Though a check valve is not shown as being incorporated into the plate 38 of the FIG. 5 embodiment, it will be clear that such a member, as shown in FIG. 4, may be used as well in the FIG. 5 embodiment.

Figure 6:
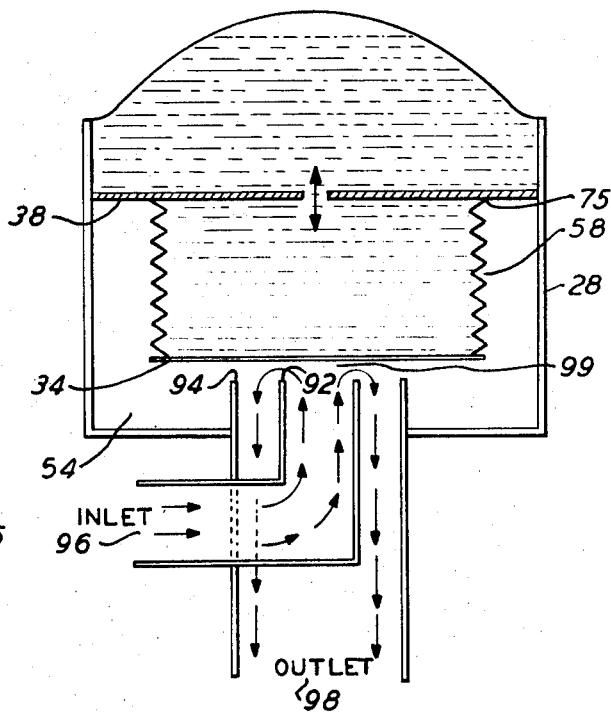
FIG. 6 is a schematic cross-section of an alternate form of the FIG. 5 apparatus.

The schematic cross-sectional view of FIG. 6 illustrates a variation of the FIG. 5 embodiment, wherein the bounding means cooperating with movable wall 34 takes the simplified form of the concentric annular rings 92 and 94 defined respectively by the ends of tubular inlet 96 and coaxial surrounding outlet 98, which portions project slightly within chamber 28. The ring-like surfaces define with wall 34 a gas passageway 99 which varies in cross-section in accordance with the vertical position of wall 34. It will, of course, be evident that the concentric tubular inlet- outlet arrangement depicted may be similarly employed with a flexible diaphragm 34 as in FIGS. 2 through 4.

While the present invention has been particularly set forth in terms of specific embodiments thereof, it will be understood in view of the instant disclosure that numerous variations upon the invention are now enabled to those skilled in the art, which variations yet reside within the scope of the instant teaching. It is, for example, within the province of the present invention, to utilize air alone as the damping fluid. This can be done by terminating the chamber 28 of FIGS. 2 through 5 at the plate 38, with air alone being present as the damping fluid 42 between movable wall 34 and the plate. In general, however, air per se is not as effective a damping medium as the liquid and does not offer as wide a degree of control. It may also be noted in the same connection, that by varying the choice of damping fluids a wide variety of response characteristics is enabled in the present device whereby such device may be utilized under a variety of respiratory conditions. Similarly, it is possible to utilize simple means to vary the orifice 40 provided at plate 38. For example, a simple slide member containing a plurality of discreet and differing-size openings may be movably mounted in a track overlying the basic opening 40. In effect, a variable stop diaphragm is thus enabled.

Accordingly, the present invention is to be broadly construed, and limited only by the scope and spirit of the claims now appended hereto.

I claim:

1. A device for modifying the normal square-pulse characteristic of the flow curve of square-wave respirator systems; to provide a gradual development to peak flow, comprising in combination:
   a. a chamber;
   b. a movable wall mounted for displacement in said chamber;
   c. a gas flow space between said wall and one side of said chamber;
   d. an inlet and an outlet to said gas flow space for connection of said device in line with the breathing circuit of said respirator system;
   e. a relatively rigid first plate mounted across said chamber and spaced from said movable wall, on the side of said wall non-adjacent to said one side, the space between said plate and wall defining a fluid damping reservoir;
   f. bounding means between said inlet and outlet, defining with at least a portion of said movable wall, a variable cross-section gas passageway varying in accordance with the displacement of said portion of said movable wall;
   g. an orifice communicating with said fluid damping reservoir;
   h. a fluid within the said damping reservoir displaceable through said orifice in response to displacement of said movable wall toward said plate by pressure changes introduced at said flow space by the inspiratory portion of said breathing cycle; the bleeding of said fluid through said orifice allowing controlled growth in cross-section of said gas passageway, thereby providing a damping in build-up of the gas flow through said device; and
   i. means to restore the original position of said movable wall upon completion of a gas flow pulse, and to return fluid to said reservoir.

2. Apparatus in accordance with claim 1 wherein said fluid is air, and said movable wall comprises a flexible diaphragm secured at its perimeter to said chamber, the said restoring means including the unsecured portions of said diaphragm, which portions upon displacement provide a restoring force arising from self-elasticity.

3. Apparatus according to claim 1 further including a retaining diaphragm mounted across said chamber and spaced from said plate on the side opposite said movable wall; said orifice further communicating with the space between said plate and retaining diaphragm; fluid passing through said orifice being trapped between said retaining diaphragm and said plate.

4. Apparatus in accordance with claim 3 wherein said orifice is provided through said plate.

5. Apparatus in accordance with claim 3 wherein said orifice is connected to the said space between said plate and retaining diaphragm by a connecting tube.

6. Apparatus in accordance with claim 3 further including a check valve mounted at said orifice plate and openable to permit said fluid to return at least in part through said valve to the space between said plate and movable wall upon the completion of said gas flow pulse.

7. Apparatus in accordance with claim 3 wherein said movable wall comprises a flexible diaphragm secured at its perimeter to said chamber, the said restoring means including the unsecured portions of said flexible diaphragm, which portions upon displacement provide a restoring force arising from self-elasticity.

8. Apparatus in accordance with claim 7 wherein said plate is mounted in a substantially horizontal plane, and said movable wall is displaceable in a vertical direction, whereby said fluid may return under the influence in part of gravitational flow-through at said orifice.

9. Apparatus in accordance with claim 3 wherein said movable wall comprises a second plate secured to said first plate by a bellows; said first plate being mounted in said device at a substantially horizontal plane and said second plate being displaceable in a generally vertical direction whereby said second plate is restored to its original position at least in part by gravitational flow-through of the fluid displaced above said first plate during the gas flow pulse.

10. Apparatus in accordance with claim 9 further including check valve means mounted in said first plate, openable to facilitate return of said fluid from above to below said plate.

11. Apparatus in accordance with claim 3 further including means to vary the flow through said orifice.

12. Apparatus in accordance with claim 1 wherein said restoring means is at least in part spring actuated.

13. Apparatus in accordance with claim 3 wherein the inherent elasticity of said retaining diaphragm comprises at least part of said restoring means.

14. Apparatus in accordance with claim 3 wherein said restoring means is at least in part spring actuated.

15. A device for modifying the normally square pulse characteristic of the flow curve of a respirator system to provide a gradual development to peak flow, comprising in combination:

a. a gas conduit having an inlet for receiving gas from the respirator and an outlet for delivering the gas to a patient;

b. said gas conduit having a movable wall portion to change the cross-section of said gas conduit;

c. a damping reservoir surrounding said movable wall and containing a fluid acting against said movable wall;

d. said damping reservoir having an orifice in one wall thereof;

e. a fluid chamber adapted to receive and contain fluid passing from said damping reservoir through said orifice;

f. said movable wall adapted to be displaced by an increasing flow in said gas conduit to enlarge the cross-section of said gas conduit whereby a portion of the fluid passes through said orifice to said fluid chamber at a controlled rate to provide damping in build-up of the gas flow through said device; and g. means to restore the original position of said movable wall upon completion of a gas flow pulse and to return fluid from said fluid chamber to said damping reservoir.

16. A device in accordance with claim 15 wherein said movable wall is a flexible diaphragm.

17. A device in accordance with claim 16 wherein said orifice includes means to vary its flow area.

18. A device for modifying the normally square pulse characteristic of the gas flow from a respirator to provide a gradual development to peak flow, comprising in combination:

a. a gas conduit having an inlet for receiving gas from the respirator and an outlet for delivering the gas to a patient;

b. said gas conduit having a movable wall portion to change the cross-section of said gas conduit;

c. said movable wall adapted to be displaced by an increasing flow in said gas conduit to enlarge the cross-section of said gas conduit;

d. damping means acting upon said movable wall to damp the displacement of said movable wall, thereby providing a damping in build-up of the gas flow through said device, said damping means comprising a fluid-containing chamber surrounding said movable wall and means for bleeding said fluid from said chamber at a controlled rate when said movable wall is displaced to enlarge the cross-section of said gas conduit; and e. means to restore the cross-section of said gas conduit to its initial state upon completion of a gas flow pulse.

19. A device in accordance with claim 18 wherein said means to restore the cross-section of said gas conduit comprises a further fluid chamber adapted to receive fluid bled from said fluid containing chamber and to return said received fluid to said fluid containing chamber upon completion of a gas flow pulse.

* * * * *

UNITED STATES PATENT OFFICE
CERTIFICATE OF CORRECTION

PATENT NO. : 3,853,147
DATED : December 10, 1974
INVENTOR(S) : ANTHONY B. CIBULKA It is certified that error appears in the above—identified patent and that said Letters Patent are hereby corrected as shown below:

Col. 1, line 20, "respirator" should read -- respiratory --.

Col. 3, line 65, after "movable" the word -- wall -- should be inserted.

Col. 4, line 32, "path" should read -- plate --.

Col. 5, line 35, "normal" should read -- normally --.

Signed and sealed this 29th day of April 1975.

(SEAL)
Attest:

RUTH C. MASON
Attesting Officer

C. MARSHALL DANN
Commissioner of Patents
and Trademarks